(12) United States Patent
Blanchet

(10) Patent No.: US 10,583,481 B2
(45) Date of Patent: Mar. 10, 2020

(54) PART OBTAINED BY SELECTIVE MELTING OF A POWDER COMPRISING A MAIN ELEMENT AND RIGID SECONDARY ELEMENTS

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Etienne Blanchet, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 517 days.

(21) Appl. No.: 14/768,192

(22) PCT Filed: Feb. 12, 2014

(86) PCT No.: PCT/EP2014/052732
§ 371 (c)(1),
(2) Date: Aug. 14, 2015

(87) PCT Pub. No.: WO2014/124971
PCT Pub. Date: Aug. 21, 2014

(65) Prior Publication Data
US 2016/0001365 A1    Jan. 7, 2016

(30) Foreign Application Priority Data
Feb. 15, 2013 (FR) .................................. 13 51327

(51) Int. Cl.
*B22F 3/105* (2006.01)
*B22F 5/00* (2006.01)
(Continued)

(52) U.S. Cl.
CPC ............ *B22F 3/1055* (2013.01); *B22F 5/007* (2013.01); *B23K 26/342* (2015.10);
(Continued)

(58) Field of Classification Search
CPC ..... B22F 3/1055; B22F 5/007; B29D 30/0601
See application file for complete search history.

(56) References Cited

U.S. PATENT DOCUMENTS

| 3,655,818 A | * | 4/1972 | McKown | ................. B32B 3/12 427/208.2 |
| 5,595,703 A | | 1/1997 | Swaelens et al. | |

(Continued)

FOREIGN PATENT DOCUMENTS

| WO | 2010072960 | 7/2010 |
| WO | 2012131481 | 10/2012 |

OTHER PUBLICATIONS

International Search Report for PCT/EP2014/052732 dated May 15, 2014.

*Primary Examiner* — Donald J Loney
(74) *Attorney, Agent, or Firm* — Dickinson Wright PLLC

(57) ABSTRACT

A part obtained by selective melting of a powder on a support plate, this part comprising a main element and rigid secondary elements, these secondary elements supporting the main element between a lower surface of this main element and the support plate. Secondary elements are intended to be detached from the main element. The lower surface of the main element thus comprises a first surface portion and at least one second surface portion, and the first surface portion makes, with the support plate, an angle $\alpha 1$ (Continued)

of less than a predetermined value, and the second surface portion makes, with this support plate, an angle $\alpha 2$ greater than or equal to this predetermined value. The first surface portion is therefore entirely supported by the secondary elements and the second surface portion is partially supported by the secondary elements. The predetermined value is between 20° and 30°.

13 Claims, 2 Drawing Sheets

(51) Int. Cl.
*B23K 26/342* (2014.01)
*B29D 30/06* (2006.01)
*G05B 19/4097* (2006.01)
*B33Y 50/02* (2015.01)
*B33Y 80/00* (2015.01)
*B29L 31/00* (2006.01)

(52) U.S. Cl.
CPC ..... *B29D 30/0601* (2013.01); *G05B 19/4097* (2013.01); *B29L 2031/757* (2013.01); *B33Y 50/02* (2014.12); *B33Y 80/00* (2014.12)

(56) References Cited

U.S. PATENT DOCUMENTS

| 6,551,441 | B1* | 4/2003 | Sato ............... B29C 70/088 156/323 |
|---|---|---|---|
| 2009/0072447 | A1 | 3/2009 | Hull et al. |
| 2010/0042241 | A1 | 2/2010 | Inoue |
| 2011/0309230 | A1 | 12/2011 | Lauwers et al. |

* cited by examiner

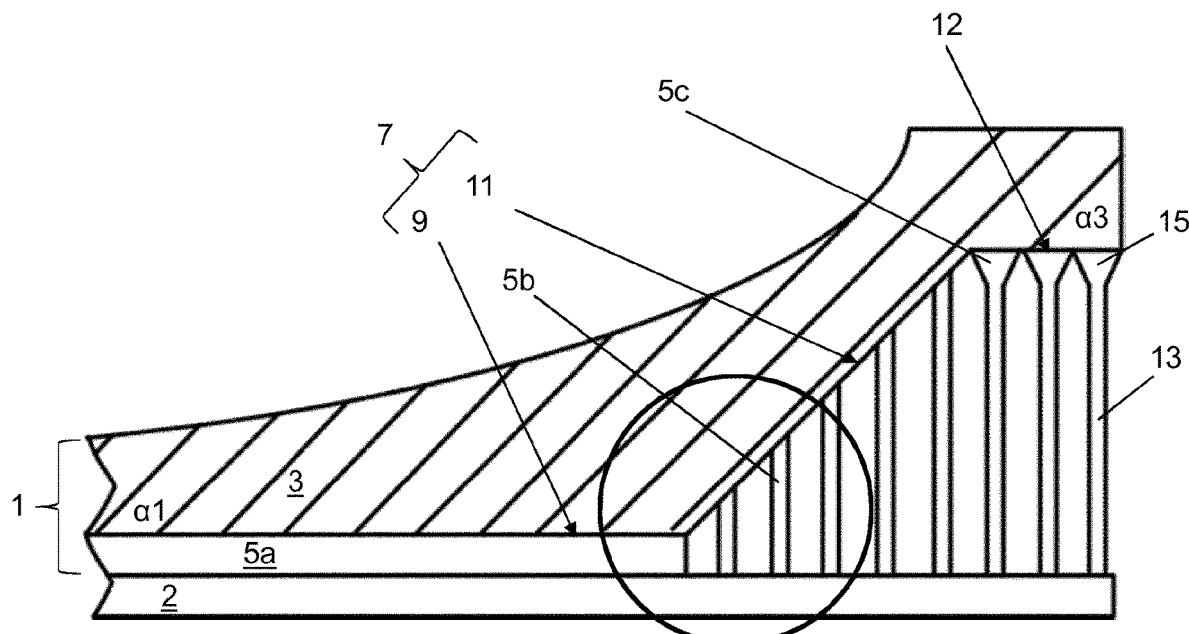
Fig. 1
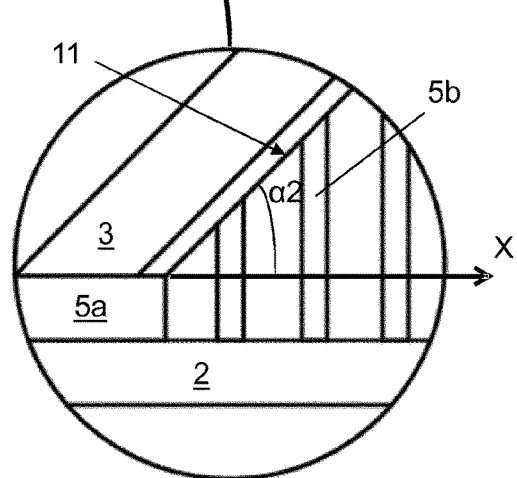

PART OBTAINED BY SELECTIVE MELTING OF A POWDER COMPRISING A MAIN ELEMENT AND RIGID SECONDARY ELEMENTS

This application is a 371 national phase entry of PCT/EP2014/052732, filed 12 Feb. 2014, which claims benefit of French Patent Application No. 1351327, filed 15 Feb. 2013, the entire contents of which are incorporated herein by reference for all purposes.

BACKGROUND

Field

The present disclosure relates to the manufacture of molding elements for vulcanizing and molding tires, and more particularly to the manufacture of molding elements obtained by the selective melting of a powder.

Description off Related Art

It is known practice to create a molding element using a method of selective melting, more commonly referred to as sintering. This method uses a beam of energy to melt a powder. A "beam of energy" means electromagnetic radiation (for example a laser beam) or a beam of particles (for example an electron beam).

A sintering method using a laser, hereinafter referred to as a laser sintering method, is known from document EP1641580. In that document, a first layer of powder is spread on a support plate by a layering member. All or some of the particles of powder of this first layer of powder are then agglomerated by the laser beam according to the shape of the object that is to be obtained. Once this step has been performed, a second layer of powder is spread on the first layer of powder so that it in turn can be selectively melted using the laser. By repeating these operations of spreading a layer and fusing using a laser, a sintered object is built up layer by layer.

Document WO2010072960 discloses a method for manufacturing a molding element using sintering. In that method, rigid secondary elements are produced at the same time as the molding element, so as to support this molding element. The molding element thus comprises a bar, denoted 24 in that document, and fins 26. The secondary elements notably comprise support parts 36 and joining parts 28. The support parts 36 have a thickness corresponding substantially to the thickness of the surface portion of the molding element that they support and the joining parts have a smaller thickness than these support parts so that they can form break lines facilitating the detachment of the molding element from the support plate. However, the presence of these joining parts of a smaller thickness than the molding element means that this molding element is supported partially by unsintered powder, as it is being manufactured. Now, the inventors have found that, for certain shapes of molding element, this partial support can lead to problems in the manufacture of this molding element.

There is therefore a need to improve the manufacture of molding elements using sintering, while at the same time optimizing the use of the secondary elements supporting these molding elements.

Definitions

A "tire" means all types of resilient tread whether or not it is subjected to an internal pressure.

A "tread" of a tire means a quantity of rubbery material delimited by lateral surfaces and by two main surfaces one of which is intended to come into contact with a roadway when the tire is running.

A "mold" means a collection of separate molding elements which, when brought closer together, delimit a toroidal molding space for vulcanizing and molding a tire.

A "molding element" means part of a mold. A molding element is, for example, part of a lining intended to mold raised elements in the tread of the tire.

SUMMARY

The invention, in an embodiment, relates to a part obtained by selective melting of a powder on a support plate. This part comprises a main element and rigid secondary elements, these secondary elements supporting the main element between a lower surface of this main element and the support plate. The secondary elements are intended to be detached from the main element. Furthermore, the lower surface of the main element comprises a first surface portion and at least one second surface portion. The embodiment of the invention is notable in that the first surface portion makes, with the support plate, an angle $\alpha 1$ of less than a predetermined value, and the second surface portion makes, with this support plate, an angle $\alpha 2$ greater than or equal to this predetermined value. This predetermined value is between 20° and 30°. The first surface portion is entirely supported by the secondary elements and the second surface portion is partially supported by the secondary elements.

The sintering method makes it possible to produce an element, for example a molding element, layer by layer. In this method, a first layer of powder is spread on the support plate, and this first layer of powder is intended to support a second layer of powder spread subsequently. Depending on the shape of the part that is to be manufactured, the first layer of powder may be partially melted and surface portions of the second layer of powder to be melted may then be supported by unmelted powder belonging to this first layer. Now, the unstable support of the second layer of powder by the first layer of powder makes the overall manufacture of the main element trickier. One solution would be to provide secondary elements that entirely support the main element of the part. However, this solution is expensive because it entails melting a large amount of powder to create these secondary elements, which elements are then scrapped once the main element has been obtained. Faced with that problem, the inventors found that, astonishingly, it was not always necessary to support the main part entirely using secondary elements in order to ensure good manufacture of this main part. More particularly, the inventors have found that when the lower surface of the part made with the support plate an angle greater than or equal to a certain value, for example an angle comprised between 20° and 30°, total support of the main element in this surface portion was unnecessary and partial support was enough to ensure quality manufacture of the main element. Thus it is possible to limit the use of the secondary elements in certain configurations of the main element, thereby making it possible to better rationalize manufacture thereof.

In one particular embodiment, with the second surface portion having a given surface area, this second surface portion is supported over at most 50% of its surface area by the secondary elements.

By virtue of embodiments of the invention, there is no need to have the main element supported entirely by melted powder. Consequently, a proportion of the powder not melted during manufacture of a first main element can be used again in the manufacture of another main element. Thus the use of the powder is rationalized.

In one preferred embodiment, the second surface portion is supported over at least 20% of its surface area by the secondary elements.

The inventors have found that a minimum amount of support was necessary for manufacturing the main element in the region of the second surface portion thereof. These inventors thus determined that it was necessary to support at least 20% of this second surface portion in order to obtain sufficient quality in the manufacture of the main element.

Another subject of the invention is a method for designing a part obtained by selective melting of a powder on a support plate. This part comprises a main element and rigid secondary elements. The secondary elements support the main element between a lower surface of this main element and the support plate. The secondary elements are intended to be detached from the main element. The lower surface of the main element comprises at least two surfaces parts. The method of an embodiment of the invention is notable in that it comprises a step in which an angle is determined for each surface portion of the lower surface of the main element, this angle being formed by the surface portion and the support plate. In another step, the characteristics of the support of the surface portion by the secondary elements is determined as a function of the angle formed by this surface portion with the support plate. In instances in which the angle of the surface portion is less than a predetermined value, this surface portion is entirely supported by the secondary elements. In instances in which the angle of the surface portion is greater than or equal to this predetermined value, this surface portion is partially supported by the secondary elements, the predetermined value being comprised between 20° and 30°.

The design method of an embodiment of the invention thus provides for a step that allows the characteristics of the secondary elements to be defined in advance. In this way, adequate support of the main element is sought, while at the same time restricting the use of secondary elements. The features of these secondary elements are then parametrized in the machine that will sinter the part, thus making it possible to optimize the sintering operation.

BRIEF DESCRIPTION OF THE DRAWINGS

Other features and advantages of the invention will become apparent from the following description, given by way of nonlimiting example, with reference to the attached drawings in which:

FIG. 1 schematically depicts a view in section of a part according to an embodiment of the invention;

DETAILED DESCRIPTION OF SPECIFIC EMBODIMENTS

Figure 2:
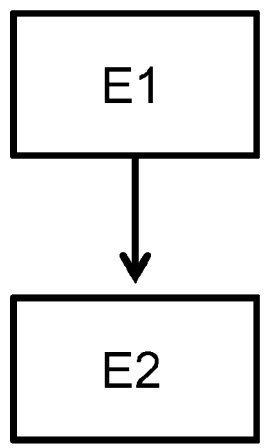
FIG. 2 schematically depicts the steps of a method for designing the part of FIG. 1.

In the description which follows, elements which are substantially identical or similar will be denoted by identical references.

FIG. 1 schematically depicts a view in cross section of a part 1 obtained by selectively melting a powder on a support plate 2. This part 1 comprises a main element 3 and secondary elements 5a, 5b, 5c supporting the element. This main element 3 here forms a molding element for vulcanizing and molding all or part of a tire tread. More particularly, the main element 3 comprises a first surface portion 9, a second surface portion 11, a third surface portion 12. The first surface portion 9 here makes a zero angle α1 with the support plate. The second surface portion 11 makes an angle α2 greater than or equal to 20° in terms of absolute value. For preference, the second surface portion 11 makes an angle α2 greater than or equal to 30° in terms of absolute value. The third surface portion 12 makes an angle α3 which is likewise zero. All of these surface portions together form the lower surface 7 of the main element. For each surface portion there are specific associated secondary elements. Thus, the first surface portion 9 is supported entirely by a secondary element 5a having a cross section that is rectangular overall. The second surface portion 11 is partially supported by a plurality of secondary elements 5b. These secondary elements are formed of a thin body. The third surface portion 12 is supported by secondary elements 5c. These secondary elements comprise a body 13 and a head 15. The heads 15 of the various secondary elements 5c in this instance meet in order entirely to support the third surface portion 12.

It will be noted that the second surface portion 11 is in this instance supported over at most 50% of its surface by the secondary elements 5b. Likewise, the second surface part 11 is supported over at least 20% of its surface by the secondary elements 5b.

As has already been emphasized, the main element 3 and the secondary elements 5a, 5b, 5c are formed by selective melting of a powder, it being possible for this powder to be a metallic, organic (ceramic) or plastic powder. This powder may also be a blend of different types of powder.

FIG. 2 schematically depicts the steps of a method for designing the part 1 of FIG. 1.

The method comprises a first step E1 in which an angle is determined for each surface portion of the lower surface of the main element, this angle being formed by the surface portion and the support plate.

In a second step E2 of the method, the characteristics of the support of the surface portion by the secondary elements is determined as a function of the angle formed by this surface portion with the support plate. If the angle of the surface portion is less than a predetermined value, this surface portion is entirely supported by the secondary elements and if the angle of the surface portion is greater than or equal to this predetermined value, the surface portion is partially supported by the secondary elements. As has already been emphasized, the predetermined value is comprised between 20° and 30°. For example, this predetermined value is equal to 20°. As an alternative, this predetermined value is equal to 30°.

The invention is not restricted to the examples described and depicted and various modifications can be made thereto without departing from its scope.

In FIG. 1, the secondary elements 5b, 5c extend in the width of the main element, namely in a direction perpendicular to the plane of section of these figures. As an alternative, the secondary elements may extend along the length of the main element.

Finally, the invention may be applied to the manufacture of any type of elements other than molding elements.

The invention claimed is:

1. A part obtained by selective melting of a powder on a support plate, this part comprising:
   a main element, and
   a plurality of secondary elements, these secondary elements supporting the main element between a lower surface of this main element and the support plate, wherein the secondary elements are adapted to be detached from the main element, wherein the lower surface of the main element comprises:
a first surface portion, and
at least one second surface portion wherein the first surface portion makes, with the support plate, an angle α1 of less than a predetermined value, and the second surface portion makes, with this support plate, an angle α2 greater than or equal to this predetermined value, wherein the predetermined value is a single value between 20° and 30°, and wherein the first surface portion is entirely supported by a first secondary element of the plurality of secondary elements and the second surface portion is partially supported by second secondary elements of the plurality of secondary elements, wherein both the main element and secondary elements are composed of laser sintered melted powder;

wherein the lower surface of the main element comprises a third surface portion that makes, with the support plate, an angle α3 of less than the predetermined value, wherein the third surface portion is supported by third secondary elements of the plurality of secondary elements, wherein the third secondary elements include head portions supported by body portions, wherein the head portions meet and entirely support the third surface portion.

2. The part according to claim 1, wherein, with the second surface portion having a surface area, this second surface portion is supported over at most 50% of its surface area by the secondary elements.

3. The part according to claim 2, wherein the second surface portion is supported over at least 20% of its surface area by the secondary elements.

4. The part according to claim 1, wherein the part is shaped in a semi-circular shape.

5. The part according to claim 1, wherein the third surface portion is oriented at an angle parallel to the first surface portion.

6. The part according to claim 5, wherein the third surface portion is supported by the third secondary elements that are each of a same height, and the head portions include tapered ends.

7. The part according to claim 1, wherein the first surface portion is supported by a singular solid piece of the secondary elements.

8. The part according to claim 1, wherein the second surface portion is supported by a plurality of discrete column structures of the secondary elements.

9. The part according to claim 7, wherein the second surface portion is supported by a plurality of discrete column structures of the secondary elements.

10. The part according to claim 6, wherein the first surface portion is supported by a singular solid piece of the secondary elements.

11. The part according to claim 10, wherein the second surface portion is supported by a plurality of discrete column structures of the secondary elements.

12. The part according to claim 1, wherein the main element includes a curved portion opposing a side contacting the first and the at least one second surface portion.

13. The part according to claim 1, wherein the first surface portion is entirely supported by the first secondary element having a cross-section that is rectangular overall.

* * * * *